(12) United States Patent
Chen et al.

(10) Patent No.: US 12,200,739 B2
(45) Date of Patent: Jan. 14, 2025

(54) METHOD AND USER EQUIPMENT FOR MULTICAST/BROADCAST SERVICE DATA RECEPTION

(71) Applicant: SHARP KABUSHIKI KAISHA, Sakai (JP)

(72) Inventors: Hung-Chen Chen, Taipei (TW); Mei-Ju Shih, Taipei (TW); Chia-Hung Lin, Taipei (TW); Yung-Lan Tseng, Taipei (TW); Chie-Ming Chou, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 272 days.

(21) Appl. No.: 17/791,371

(22) PCT Filed: Jan. 8, 2021

(86) PCT No.: PCT/CN2021/070794
§ 371 (c)(1),
(2) Date: Jul. 7, 2022

(87) PCT Pub. No.: WO2021/139747
PCT Pub. Date: Jul. 15, 2021

(65) Prior Publication Data
US 2023/0040690 A1     Feb. 9, 2023

Related U.S. Application Data

(60) Provisional application No. 62/959,741, filed on Jan. 10, 2020.

(51) Int. Cl.
*H04H 20/71*     (2008.01)
*H04W 4/06*     (2009.01)
*H04W 72/30*     (2023.01)

(52) U.S. Cl.
CPC .............. *H04W 72/30* (2023.01); *H04W 4/06* (2013.01)

(58) Field of Classification Search
USPC ........................................................ 370/312
See application file for complete search history.

(56) References Cited

U.S. PATENT DOCUMENTS

2009/0207773 A1     8/2009  Feng et al.
2010/0189025 A1     7/2010  Cheng
(Continued)

FOREIGN PATENT DOCUMENTS

EP     3525494 A1     8/2019
EP     3570482 A1     11/2019
(Continued)

OTHER PUBLICATIONS

3GPP TS 38.321, "3rd Generation Partnership Project; Technical Specification Group Radio Access Network; NR; Medium Access Control (MAC) protocol specification (Release 15)", V15.7.0 (Sep. 2019).

(Continued)

*Primary Examiner* — Chuong T Ho
(74) *Attorney, Agent, or Firm* — ScienBiziP, P.C.

(57) ABSTRACT

A method for multicast service data reception is provided. The method determines whether a first PDCCH addressed to a first RNTI is received on a first BWP. When a BWP inactivity timer is configured, a default BWP is configured, and the first BWP is not the default BWP, the method (re)starts the BWP inactivity timer after determining that the first PDCCH is received on the first BWP, and switches to the default BWP when the BWP inactivity timer expires. When the BWP inactivity timer is configured, the default BWP is not configured, and the first BWP is not an initial BWP, the method (re)starts the BWP inactivity timer after (Continued)

determining that the first PDCCH is received on the first BWP, and switches to the initial BWP when the BWP inactivity timer expires.

18 Claims, 6 Drawing Sheets

(56) References Cited

U.S. PATENT DOCUMENTS

| | | |
|---|---|---|
| 2010/0202340 A1 | 8/2010 | Josiam et al. |
| 2011/0051676 A1 | 3/2011 | Josiam et al. |
| 2018/0248708 A1 | 8/2018 | Won et al. |
| 2018/0310283 A1 | 10/2018 | Deenoo et al. |
| 2019/0132824 A1* | 5/2019 | Jeon .................. H04L 5/00 |
| 2019/0182870 A1 | 6/2019 | Shih et al. |
| 2019/0261356 A1 | 8/2019 | Myung et al. |
| 2019/0357262 A1* | 11/2019 | Cirik .................. H04W 80/02 |
| 2022/0007399 A1* | 1/2022 | Rastegardoost ...... H04L 5/0055 |

FOREIGN PATENT DOCUMENTS

| | | |
|---|---|---|
| KR | 20150018248 A | 2/2015 |
| KR | 20150048611 A | 5/2015 |
| KR | 20190070841 A | 6/2019 |
| WO | 2013048514 A1 | 4/2013 |
| WO | 2019139436 A1 | 7/2019 |

OTHER PUBLICATIONS

3rd Generation Partnership Project, Technical Specification Group Radio Access Network; NR; Medium Access Control (MAC) protocol specifiation (Release 15), 3GPP TS 38.321 V15.8.0 (Dec. 2019), Jan. 7, 2020.

Huawei et al: "Discussion on BWP inactivity timer", 3GPP Draft; R2-1800189, 3GPP TSG-RAN2#AH-1801, Vancouver, Canada, Jan. 22-26, 2018 (Jan. 12, 2018).

\* cited by examiner

METHOD AND USER EQUIPMENT FOR MULTICAST/BROADCAST SERVICE DATA RECEPTION

CROSS-REFERENCE TO RELATED APPLICATION(S)

The present disclosure is the national stage application, filed under 35 U.S.C. § 371, of International Patent Application No. PCT/CN2021/070794, filed on Jan. 8, 2021, which claims the benefit of and priority to U.S. Provisional Patent Application Ser. No. 62/959,741, filed on Jan. 10, 2020, entitled "Mechanism for Supporting Multicast and Broadcast Services in Next Generation Network," the contents of all of which are hereby fully incorporated herein by reference for all purposes.

FIELD

The present disclosure is generally related to wireless communications, and specifically, to a method and a User Equipment (UE) for Multicast/Broadcast Service (MBS) data reception.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a UE for MBS data reception.

According to a first aspect of the present disclosure, a method for MBS data reception is provided. The method includes receiving MBS-related control information from a Base Station (BS), the MBS-related control information indicating at least one of: a first Radio Network Temporary Identifier (RNTI) associated with an MBS, a Control Resource Set (CORESET) configured for an MBS, a search space configured for the MBS, and a frequency resource configured for the MBS; and receiving data of the MBS from the BS based on the MBS-related control information.

According to a second aspect of the present disclosure, a UE for MBS data reception is provided. The UE includes a processor and a memory coupled to the processor, wherein the memory stores a computer-executable program that when executed by the processor, causes the processor to perform the method(s) for MBS data reception in accordance with various implementations of the present disclosure.

According to a third aspect of the present disclosure, a method performed by a User Equipment (UE) for multicast service data reception is provided. The method includes determining whether a first Physical Downlink Control Channel (PDCCH) addressed to a first Radio Network Temporary Identifier (RNTI) is received on a first Bandwidth Part (BWP), the first PDCCH indicating a downlink assignment of data of a multicast service; in a case that a BWP inactivity timer and a default BWP are configured, and the first BWP is not the default BWP, starting or restarting the BWP inactivity timer after determining that the first PDCCH is received on the first BWP, and switching from the first BWP to the default BWP when the BWP inactivity timer expires; and in a case that the BWP inactivity timer is configured, but the default BWP is not configured, and the first BWP is not an initial BWP, starting or restarting the BWP inactivity timer after determining that the first PDCCH is received on the first BWP, and switching from the first BWP to the initial BWP when the BWP inactivity timer expires.

In some implementation of the third aspect of the present disclosure, the method further includes receiving control information from a Base Station (BS); and receiving the data of the multicast service according to the control information, wherein the control information indicates at least one of: a Control Resource Set (CORESET) configured for the multicast service, a search space configured for the multicast service, and a frequency resource configured for the multicast service.

In some implementation of the third aspect of the present disclosure, the method further includes receiving, from a Base Station (BS), an indicator indicating whether a Hybrid Automatic Repeat reQuest (HARQ)-Acknowledgement (ACK) feedback transmission for the data of the multicast service is enabled.

In some implementation of the third aspect of the present disclosure, the method further includes receiving the data of the multicast service via a first Radio Link Control (RLC) entity of the UE; and receiving a copy of the data of the multicast service via a second RLC entity of the UE, wherein the first RLC entity and the second RLC entity are associated with a common Packet Data Convergence Protocol (PDCP) entity of the UE.

In some implementation of the third aspect of the present disclosure, the data of the multicast service is received from a Base Station (BS) under a Point-to-Multiple (PTM) delivery mode, and the copy of the data of the multicast service is received from the BS under a Point-to-Point (PTP) delivery mode.

In some implementation of the third aspect of the present disclosure, the method further includes transmitting an indication that the UE supports receiving the data of the multicast service to a Base Station (BS).

In some implementation of the third aspect of the present disclosure, the method further includes determining whether there is an ongoing random access procedure associated with a serving cell; and starting or restarting the BWP inactivity timer after determining that there is no ongoing random access procedure associated with the serving cell.

In some implementation of the third aspect of the present disclosure, the method further includes determining whether an ongoing random access procedure associated with a serving cell is successfully completed upon reception of a second PDCCH addressed to a second RNTI; and starting or restarting the BWP inactivity timer after determining that the ongoing random access procedure is successfully completed.

In some implementation of the third aspect of the present disclosure, the second RNTI is a Cell RNTI (C-RNTI).

According to a fourth aspect of the present disclosure, a User Equipment (UE) for multicast service data reception is provided. The UE includes a at least one processor and at least one memory coupled to the at least one processor, the at least one memory storing a set of computer-executable programs that when executed by the at least one processor, causes the at least one processor to perform operations including determining whether a first Physical Downlink Control Channel (PDCCH) addressed to a first Radio Network Temporary Identifier (RNTI) is received on a first Bandwidth Part (BWP), the first PDCCH indicating a downlink assignment of data of a multicast service; in a case that a BWP inactivity timer and a default BWP are configured, and the first BWP is not the default BWP, starting or restarting the BWP inactivity timer after determining that the first PDCCH is received on the first BWP, and switching from the first BWP to the default BWP when the BWP inactivity timer expires; and in a case that the BWP inactivity timer is configured, but the default BWP is not configured, and the first BWP is not an initial BWP, starting or restarting the BWP inactivity timer after determining that the first PDCCH is received on the first BWP, and switching from the first BWP to the initial BWP when the BWP inactivity timer expires.

In some implementation of the fourth aspect of the present disclosure, the operations further include receiving control information from a Base Station (BS); and receiving the data of the multicast service according to the control information, wherein the control information indicates at least one of: a Control Resource Set (CORESET) configured for the multicast service, a search space configured for the multicast service, and a frequency resource configured for the multicast service.

In some implementation of the fourth aspect of the present disclosure, the operations further include receiving, from a Base Station (BS), an indicator indicating whether a Hybrid Automatic Repeat reQuest (HARQ)-Acknowledgement (ACK) feedback transmission for the data of the multicast service is enabled.

In some implementation of the fourth aspect of the present disclosure, the operations further include receiving the data of the multicast service via a first Radio Link Control (RLC) entity of the UE; and receiving a copy of the data of the multicast service via a second RLC entity of the UE, wherein the first RLC entity and the second RLC entity are associated with a common Packet Data Convergence Protocol (PDCP) entity of the UE.

In some implementation of the fourth aspect of the present disclosure, the data of the multicast service is received from a Base Station (BS) under a Point-to-Multiple (PTM) delivery mode, and the copy of the data of the multicast service is received from the BS under a Point-to-Point (PTP) delivery mode.

In some implementation of the fourth aspect of the present disclosure, the operations further include transmitting an indication that the UE supports receiving the data of the multicast service to a Base Station (BS).

In some implementation of the fourth aspect of the present disclosure, the operations further include determining whether there is an ongoing random access procedure associated with a serving cell; and starting or restarting the BWP inactivity timer after determining that there is no ongoing random access procedure associated with the serving cell.

In some implementation of the fourth aspect of the present disclosure, the operations further include determining whether an ongoing random access procedure associated with a serving cell is successfully completed upon reception of a second PDCCH addressed to a second RNTI; and starting or restarting the BWP inactivity timer after determining that the ongoing random access procedure is successfully completed.

In some implementation of the fourth aspect of the present disclosure, the second RNTI is a Cell RNTI (C-RNTI).

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
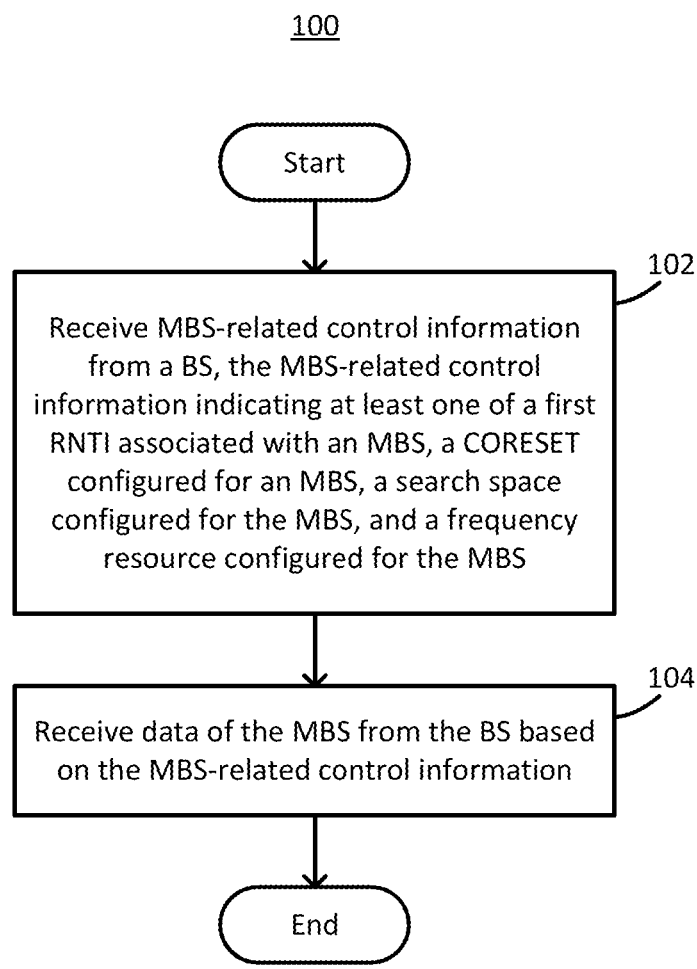
FIG. 1 illustrates a flowchart for a method for MBS data reception, in accordance with an implementation of the present disclosure.

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation,"

"in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, enhanced L (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3$^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In LTE, transmission of a Multimedia Broadcast Multicast Service (MBMS) in E-UTRAN may be performed via Multicast Broadcast Single Frequency Network (MBSFN) transmission or Single-cell Point-to-Multipoint (SC-PTM) transmission. The MBMS Coordination Entity (MCE) may determine whether to use SC-PTM or MBSFN for each MBMS session.

A single-cell transmission of MBMS may have the following features:
  MBMS is transmitted in the coverage of a single cell;
  one Single Cell Multicast Control Channel (SC-MCCH) and at least one Single Cell Multicast Transport Channel (SC-MTCH)(s) are mapped on Downlink Shared Channel (DL-SCH);
  scheduling is done by the eNB;
  SC-MCCH and SC-MTCH transmissions are each indicated by a logical channel specific RNTI on a Physical Downlink Control Channel (PDCCH) (there is a one-to-one mapping between Temporary Mobile Group Identity (TMGI) and Group RNTI (G-RNTI) used for the reception of the DL-SCH to which an SC-MTCH is mapped);
  a single transmission is used for a DL-SCH (e.g., neither blind Hybrid Automatic Repeat Request (HARQ) repetitions nor Radio Link Control (RLC) quick repeat) on which SC-MCCH or SC-MTCH is mapped; and
  SC-MCCH and SC-MTCH use the RLC-Unacknowledged Mode (UM) mode.

On the other hand, a multi-cell transmission of MBMS may have the following features:
  synchronous transmission of MBMS within its MBSFN area;
  combining of MBMS transmission from multiple cells is supported;
  scheduling of each Multicast Channel (MCH) is done by the MCE;
  a single transmission is used for a MCH (i.e., neither blind HARQ repetitions nor RLC quick repeat);
  a single Transport Block (TB) is used per Transmission Time Interval (TTI) for MCH transmission, where a TB may use all the MBSFN resources in that subframe;
  Multicast Transport Channel (MTCH) and Multicast Control Channel (MCCH) can be multiplexed on the same MCH and are mapped on MCH for Point-to-Multipoint (PTM) transmission;
  MTCH and MCCH may use the RLC-UM mode;
  the MAC subheader indicates the Logical Channel Identity (LCID) for MTCH and MCCH;
  the MBSFN synchronization area, the MBSFN area, and the MBSFN cells are semi-statically configured, e.g., by Operation & Maintenance (O&M); and
  MBSFN areas are static, unless changed by O&M (i.e., no dynamic change of areas).

However, no broadcast/multicast feature support is specified in the first two NR releases, i.e., Rel-15 and Rel-16. Nevertheless, there are important use cases for which broadcast/multicast could provide substantial improvements, especially considering system efficiency and user experience. Supporting broadcast/multicast feature may be beneficial for resource utilization since one single copy of MBS data packet can be received by multiple UEs. In addition, the communication mechanism that supports the broadcast/multicast features in next generation network is still missing.

In the present disclosure, various MBS-related operations, such as transmission of UE-specific Multicast/Broadcast Interest Indication, reception of MBS data in Bandwidth Part (BWP) switching operations, and support of dynamic change of MBS delivery between multicast (e.g., PTM delivery mode) and unicast (e.g., Point-to-Point (PTP) delivery mode) for service continuity of a given UE are provided. The MBS-related operations are more flexible and better fits the requirements of different 5G scenarios (e.g., MBS-related scenario) than LTE.

UE Capability

In some implementations, a UE may report to the network (e.g., BS) about its capability (e.g., via a UE capability message) of supporting receiving MBS (e.g., MBS with high Quality of Service (QoS) requirements) in RRC_CONNECTED state. In some implementations, a UE may report to the network (e.g., BS) about its capability (e.g., via a UE capability message) of supporting receiving MBS in RRC_INACTIVE state and/or RRC_IDLE state. In some implementations, a UE may report to the network (e.g., BS) about its capability (e.g., via a UE capability message) of supporting receiving MBS (e.g., MBS with high QoS requirements) in at least one of RRC_CONNECTED state, RRC_INACTIVE state and RRC_IDLE state. In other words, the reported capability may indicate that the UE is capable of receiving the MBS in at least one of RRC_CONNECTED state, RRC_INACTIVE state and RRC_IDLE state. A UE supports receiving MBS may mean that the UE is capable of acquire and process data packets of an MBS. For simplicity, data of an MBS may be referred as "MBS data" in the present disclosure. In some implementations, a UE in RRC_CONNECTED state (which is referred to as an "RRC_CONNECTED UE") may report its capability of supporting serving MBS (e.g., MBS with high QoS requirements) to the network (e.g., BS).

In some implementations, a UE may report its capability of supporting receiving MBS in RRC_INACTIVE state and/or RRC_IDLE state via an RA procedure, via preconfigured PUSCH resources, based on a network instruction, or based on predefined rules, where the network instruction may be transmitted via dedicated signaling or via system information broadcast by the network. For example, if a UE reports its capability of supporting receiving MBS in RRC_CONNECTED state but does not report its capability of supporting receiving MBS in RRC_INACTIVE state and/or in RRC_IDLE state, the UE may need to stay at RRC_CONNECTED state to receive MBS, and/or the network may not instruct the UE to transition to RRC_INACTIVE state or RRC_IDLE state. Otherwise, the UE may not be able to receive MBS in RRC_INACTIVE state and/or in RRC_IDLE state in this situation.

In some implementations, a UE in RRC_INACTIVE state (which is referred to as an "RRC_INACTIVE UE") or in RRC_IDLE state (which is referred to as an "RRC_IDLE UE") may report to the network about its capability of supporting receiving MBS (e.g., MBS with low QoS requirements). The UE's capability may be reported to the network via an RA procedure (e.g., a 2-step RA procedure or a 4-step RA procedure) or via preconfigured PUSCH resource(s), where the preconfigured PUSCH resource(s) may be configured via dedicated signaling (e.g., via an RRC Release message) or broadcast in system information. In some implementations, an RRC_IDLE UE or an RRC_INACTIVE UE may report its capability of supporting receiving MBS based on a network instruction or predefined rules, where the network instruction may be provided by dedicated signaling and/or system information broadcast by the network.

In some implementations, a UE may report its capability of supporting a dynamic change of MBS delivery between multicast and unicast. If a UE does not report its capability of supporting dynamic change of MBS delivery between multicast and unicast, the UE may only receive MBS provided by multicast (e.g., from a multicast radio bearer or multicast RLC bearer) or MBS provided by unicast (e.g., from a unicast radio bearer or unicast RLC bearer). MBS delivery by multicast may mean that the network (e.g., BS) delivers a single copy of MBS data packet(s) over radio to a set of UEs (which may be referred to as PTM transmission or PTM delivery mode). MBS delivery by unicast may mean that the network (e.g., BS) delivers separate copies of MBS data packet over radio to individual UE (which may be referred to as PTP transmission or PTP delivery mode).

In some implementations, a UE may report its capability of supporting dynamic change of MBS delivery between multicast and unicast based on a network instruction or predefined rules, where the network instruction may be provided by dedicated signaling and/or system information broadcast by the network.

In some implementations, a UE may report its MBS-related capability in RRC_INACTIVE state and/or RRC_IDLE state. The MBS-related capability may include, but not limited to, supporting receiving MBS, supporting dynamic change of MBS delivery between multicast and unicast, supporting dynamic change of MBS delivery between multicast and unicast based on a network instruction or predefined rules, and/or supporting receiving MBS via both of PTM delivery mode and PTP delivery mode from the network simultaneously.

In some implementations, a UE may report the MBS-related capability in RRC_INACTIVE state and/or RRC_IDLE state via PUSCH resources (e.g., the PUSCH resource(s) indicated in Message A (MsgA) of a 2-step RA procedure, the PUSCH resource(s) indicated in Message 2 (Msg2) of a 4-step RA procedure, or any other preconfigured PUSCH resources).

In some implementations, a UE may report its MBS-related capability of supporting simultaneous PTM and PTP (e.g., receiving MBS delivered via the PTM delivery mode and the PTP delivery mode simultaneously), to the network. For example, for a UE that supports simultaneous PTM and PTP, the UE may receive MBS data via a PTM RLC entity and receive a copy/duplicate of the MBS data via a PTP RLC entity. The PTM RLC entity and the PTP RLC entity may be associated with a common PDCP entity.

In some implementations, a UE may report its capability of whether the UE can receive MBS or whether the UE can start/request MBS to acquire MBS data. For example, in RRC_INACTIVE state, the UE may initiate/trigger a 4-step RA procedure, and transmit an MBS-related message to the network (e.g., gNB/BS) during the initiated/triggered 4-step RA procedure (e.g., via Message 3 (Msg3) transmission). The MBS-related message may indicate UE capability (e.g., MBS-related capability), the interested MBS, and/or the currently-receiving MBS(s).

In some implementations, an RRC_IDLE/RRC_INACTIVE UE may not move to RRC_CONNECTED state if the UE sends an MBS request to the network to start/acquire/request the (interested) MBS. In some implementations, an MBS may refer to a new network slicing type for which the UE may report to the CN the corresponding Network Slice Selection Assistance Information (MSSAI) or Single Network Slice Selection Assistance information (S-NSSAI). In this case, the UE may only report the MBS-related capability while the UE is connected to an MBS-capable gNB.

In some implementations, the UE may send its MBS-related capability, or its capability associated with an MBS (only) when the serving cell supports the corresponding MBS. The serving cell may broadcast (e.g., by system information delivery) MBS-related control information that indicates which MBS (e.g., MBS with high QoS requirements or MBS with low QoS requirements) is supported by the serving cell. For example, the serving cell may broadcast an MBS Identity (ID) associated with a target MBS.

If the information broadcast by the serving cell indicates (or is directed to) an MBS with high QoS requirements, the UE may transition to RRC_CONNECTED state to receive the MBS. In another example, the information broadcast by the serving cell indicates (or is directed to) an MBS with low QoS requirements, the UE may not transition to RRC_CONNECTED state to receive the MBS, but may receive the MBS in RRC_IDLE or RRC_INACTIVE state. The mapping between an MBS ID and a concerned MBS may be known by the RAN and the UE(s). A UE may provide its MBS-related capability or its capability associated with the concerned MBS after the MBS ID (of the concerned MBS) is broadcast by the serving cell. Conversely, the UE may not report its MBS-related capability or its capability associated with the concerned MBS if the MBS ID is not broadcast by the serving cell. The abovementioned rules may be applicable to the UE(s) in RRC_CONNEC IED/RRC_INACITVE/RRC_IDLE state.

In some implementations, the UE capability described in this disclosure may be frequency-dependent. For example, the UE capability may be separately determined for Frequency Range 1 (FR1) and Frequency Range 2 (FR2). In some implementations, the UE capability described in this disclosure may be separately determined for Time Division Duplex (TDD) and Frequency Division Duplex (FDD).

Determine MBS of Interest

In some implementations, a UE which is capable of receiving MBS may determine/consider an MBS of interest if the UE is receiving data of the MBS or is interested in receiving the MBS.

In some implementations, an MBS may be considered by a UE as an interested MBS if at least one of the following conditions is satisfied: the UE is capable of receiving the MBS, the UE is receiving data of the MBS or is interested in receiving the MBS, and the MBS is supported by a serving cell or a camped cell. In some implementations, a cell may broadcast system information to indicate which MBS(s) is supported. The start time and/or the stop time of an MBS may be broadcast by a cell to UEs in system information (e.g., in System Information Block 1 (SIB1) or other MBS-related system information block(s)). In some implementations, the start time and/or the stop time of an MBS may be indicated by Coordinated Universal Time (UTC). In some implementations, the start time and/or the stop time of an MBS may be indicated by System Frame Number (SFN). In some implementations, the MBS(s) that a cell supports may be broadcast by a cell to UEs in system information (e.g., in SIB1 or an MBS-related system information block).

In some implementations, the network may support providing a certain MBS, but have not transmitted the data of the MBS to UE(s) yet. In this situation, a UE (e.g., which is interested in the MBS) may ask the network to start transmitting the data of the MBS (e.g., by sending an MBS request to the network).

In some implementations, the operating frequency (or frequency resources) of an MBS (e.g., a particular Absolute Radio Frequency Channel Number (ARFCN), Physical Resource Blocks (PRBs), BWP or Component Carrier (CC)) may be broadcast/unicast by a cell to a UE.

In some implementations, an LTE cell or an NR cell may broadcast the operating frequency (or frequency resources) of an NR MBS (e.g., a particular NR-ARFCN, PRBs, a BWP, a CC or other assistance information such as subcarrier spacing or cyclic prefix length). An NR cell may broadcast the operating frequency of an LTE MBS (e.g., a particular ARFCN/bandwidth).

Multicast/Broadcast Interest Indication

In some implementations, a UE may send a Multicast/Broadcast Interest Indication message to the network (e.g., a gNB) to indicate the interested MBS(s). The indication may be slice-specific information or include slice information that corresponds to the interested MBS(s). A UE may report a target MBS slice to the NW. A Multicast/Broadcast Interest Indication message may include the identification information of the interested MBSs (e.g., a Temporary Mobile Group Identity (TMGI)) and/or the priority information associated with the interested MBSs. For example, an interested MBS may be identified by a TMGI and/or a session ID associated with the interested MBS. The priority information may be used to indicate whether MBS data reception is prioritized over unicast reception for a UE.

In some implementations, a UE may request the network to provide an MBS (e.g., an MBS which is supported by the network but has not been Multicast/Broadcast by the network yet). For example, the network may count the total number of UEs that are interested in a particular MBS and then deliver the content of the MBS (or MBS data) via a PTM delivery mode (or multicast mode) instead of a PTP delivery mode (or unicast mode).

In some implementations, a UE may inform the network which MBS the UE is not interested. For example, the UE may send slice information/MBS ID(s) that indicates one or more MBSs not interested by the UE to the network. The network may determine the MBS that is not interested by most of the UEs (or a specific number of UEs), and deliver the MBS via a PTP delivery mode (or unicast mode) instead of a PTM delivery mode (or multicast mode).

In some implementations, a UE may inform the network of one or more MBSs that are not required by transmitting slice information or MBS ID(s) to the network. Upon receiving the slice information of the MBS ID(s), the network may know which MBS(s) is not required by the UE. The network may then switch the UE to another BWP.

MBS Reception in BWP Switch Operation

In some implementations, a UE may be instructed by the network (e.g., via RRC, MAC CE, or DCI signaling) to switch to a specific BWP (e.g., an MBS BWP) to receive MBS. Reception of MBS may refer to receiving data of one or more MBSs.

For a UE, an MBS BWP may be a BWP that is (at least or only) used for MBS data reception. A UE capable of receiving MBS may be allowed to receive data of the (interested) MBS(s) on an MBS BWP in RRC_INACTIVE/RRC_IDLE/RRC_CONNECTED state. In one implementation, the MBS BWP may not be an initial BWP.

An MBS BWP may also be referred to as a Multicast/Broadcast BWP. The MBS BWP and the Multicast/Broadcast BWP are not uniformly named in the industry currently and are collectively referred to as the "MBS BWP" subsequently in the present disclosure.

For RRC_IDLE/RRC_INACTIVE/RRC_CONNECTED UEs, a common frequency resource(s) (or an associated MBS BWP) for a group-common PDCCH/Physical Downlink Shared Channel (PDSCH) may be configured or defined. The group-common PDCCH/PDSCH may be used for MBS data reception. If no common frequency resource is configured or defined, a UE may consider the initial BWP as the default common frequency resource for a group-common PDCCH/PDSCH.

For a PCell or a camped cell, the initial BWP may be a BWP used for initial access. In one implementation, the MBS BWP may overlap (or contain) an initial BWP in the frequency domain. In one implementation, the MBS BWP may be the same as the initial BWP. The related information of an (initial/configured/default) MBS BWP may be broadcast in system information or provided in dedicated signaling from the network, where related information of an MBS BWP may include the corresponding BWP configuration and/or allocation of frequency resources.

A BWP may be explicitly or implicitly configured by the network as an MBS BWP. For example, an MBS BWP may be associated with one or more MBSs or TMGI(s) or other MBS related information. If a BWP is configured with a Multicast/Broadcast control channel (e.g., a group-common PDCCH) or a Multicast/Broadcast data channel (e.g., a group-common PDSCH) or other Multicast/Broadcast related channel(s), the BWP may be considered as an MBS BWP. In some implementations, a BWP may be indicated as an MBS BWP via the associated BWP configuration. For example, a field or indication in an RRC message may be used to indicate whether a BWP is an MBS BWP or not. For example, if the field/indication is set to True, the BWP may be considered as an MBS BWP. In the field is set to False or not present, the BWP may be considered as a normal BWP.

In some implementations, a UE may fall back to a default BWP due to expiry of a BWP inactivity timer (which counts the time duration in the unit of milliseconds (ms)). If the network releases the BWP inactivity timer configuration (or the UE receives a message indicating to release the BWP inactivity timer configuration), the UE may stop the BWP inactivity timer without switching to the default BWP or an initial BWP (if the default BWP is not configured). The default BWP may be configured by the network. If the default BWP is not indicated by the network, the initial BWP may be considered as the default BWP.

In one implementation, once a UE switches to an MBS BWP, if a BWP inactivity timer is configured (which may be a cell-specific timer) and/or if the MBS BWP is not a default DL BWP, the UE (e.g., the MAC entity of the UE) may not switch to the default DL BWP even if the BWP inactivity timer expires.

In one implementation, once a UE switches to an MBS BWP, if a BWP inactivity timer is configured (which may be a cell-specific timer) and/or if the MBS BWP is not an initial BWP, the UE (e.g., the MAC entity of the UE) may not switch to the initial BWP even if the BWP inactivity timer expires.

In some implementations, once a UE switches to an MBS BWP, if a BWP inactivity timer is configured (which may be a cell-specific timer) and/or if the MBS BWP is not a default DL BWP, the UE (or the MAC entity of the UE) may not apply (or initiate) the BWP inactivity timer. For example, when the BWP inactivity timer is not applied, the BWP inactivity timer may be stopped or may not started or restarted by the UE.

In some implementations, once a UE switches to an MBS BWP, if a BWP inactivity timer is configured (which may be a cell-specific timer) and/or if the MBS BWP is not an initial DL BWP (and no default BWP is configured), the UE (or the MAC entity of the UE) may not apply (or initiate) the BWP inactivity timer. For example, when the BWP inactivity timer is not applied, the BWP inactivity timer may be stopped or may not started or restarted by the UE.

In some implementations, when a BWP inactivity timer is configured, if the active BWP is not a default DL BWP and/or if a PDCCH addressed to an MBS-related RNTI that indicates DL assignment or UL grant is received by the UE on the BWP, the UE may start or restart the BWP inactivity timer.

In some implementations, when a BWP inactivity timer is configured, if the active BWP is not a default DL BWP and/or if a PDCCH addressed to an MBS-related RNTI that indicates DL assignment or UL grant is received by the UE for the BWP, the UE may start or restart the BWP inactivity timer.

In some implementations, when a BWP inactivity timer is configured, if the active BWP is not the initial DL BWP (and the default BWP is not configured) and/or if a PDCCH addressed to an MBS-related RNTI that indicates DL assignment or UL grant is received by the UE on the BWP, the UE may start or restart the BWP inactivity timer.

In some implementations, when a BWP inactivity timer is configured, if the active BWP is not an initial DL BWP (and default BWP is not configured) and/or if a PDCCH addressed to an MBS-related RNTI that indicates DL assignment or UL grant is received by the UE for the BWP, the UE may start or restart the BWP inactivity timer.

For RRC_IDLE/RRC_INACTIVE UEs, a group-common PDCCH with Cyclic Redundancy Check (CRC) scrambled by a common RNTI may be configured and used to schedule a group-common PDSCH, where the group-common PDSCH may be scrambled based on the same common RNTI.

In some implementations, an MBS-related RNTI may be a Single Cell RNTI (SC-RNTI) (for dynamically scheduling SC-PTM control information), a G-RNTI (for dynamically scheduling SC-PTM transmission), a Single Cell Notification RNTI (SC-N-RNTI) (for SC-MCCH Information change notification), a MBMS RNTI (M-RNTI) (for MCCH Information change notification), or a Cell RNTI (C-RNTI). The MBS-related RNTIs include an MBS-RNTI #1 and an MBS-RNTI #2 (e.g., a G-RNTI), where the MBS-RNTI #1 may be used for MBS control information (e.g., control information on a PDCCH) and the MBS-RNTI #2 may be used for MBS traffic/data (e.g., MBS traffic/data on a PDSCH). In some implementations, an RRC_CONNECTED UE may be configured/instructed to use the MBS-RNTI #1 to descramble MBS control information (e.g., control information (or DCI) on a PDCCH) and to use the MBS-RNTI #2 to descramble MBS traffic/data (e.g., MBS traffic/data on a PDSCH). Otherwise, the RRC_CONNECTED UE may use the same common RNTI to descramble both MBS control information and for MBS traffic/data.

In one implementation, a UE may ignore a C-RNTI (e.g., for monitoring a PDCCH or CORESET(s)) when the UE operates in an MBS BWP. The Blind Decoding (BD) and Control Channel Element (CCE) limit may be adjusted. For example, the BD and CCE limit for an MBS BWP may be adjusted based on the UE's MBS-related capability. In one implementation, a UE which is capable of receiving MBS data may have different BD and CCE limits compared with a UE which is not capable of receiving MBS data.

An example of UE (or MAC entity) operation is in Table 1.

TABLE 1

The MAC entity shall for each activated Serving Cell configured with bwp-InactivityTimer:
1> if the defaultDownlinkBWP-Id is configured, and the active DL BWP is not the BWP indicated by the defaultDownlinkBWP-Id; or
1> if the defaultDownlinkBWP-Id is not configured, and the active DL BWP is not the initialDownlinkBWP:
2> if a PDCCH addressed to C-RNTI or CS-RNTI or MBS related RNTI indicating DL assignment or uplink grant is received on the active BWP; or
2> if a PDCCH addressed to C-RNTI or CS-RNTI indicating DL assignment or uplink grant is received for the active BWP; or
2> if a MAC PDU is transmitted in a configured uplink grant or received in a configured DL assignment:
3> if there is no ongoing Random Access procedure associated with this Serving Cell; or
3> if the ongoing Random Access procedure associated with this Serving Cell is successfully completed upon reception of this PDCCH addressed to C-RNTI (as specified in clauses 5.1.4 and 5.1.5):
4> start or restart the bwp-InactivityTimer associated with the active DL BWP.
2> if the bwp-InactivityTimer associated with the active DL BWP expires:
3> if the defaultDownlinkBWP-Id is configured:
4> perform BWP switching to a BWP indicated by the defaultDownlinkBWP-Id.
3> else:
4> perform BWP switching to the initialDownlinkBWP.

In some implementations, an MBS BWP may be a paired BWP or a non-paired BWP in which the UL resources may be scheduled by a specific COREST for unicast services.

In some implementations, an MBS BWP may be a pure DL-only BWP. For example, the MBS (DL) BWP may not associate with a UL BWP.

In some implementations, an MBS (DL) BWP may associate with the initial (UL) BWP.

UE Prioritization Rules between Initial BWP and MBS-BWP

In some implementations, the UE may monitor the initial BWP and an MBS BWP in DL direction (e.g., in the case of the MBS BWP not the same as the initial BWP). However, in some cases, the UE may not be able to monitor the initial BWP and the MBS BWP simultaneously (e.g., due to hardware limitation of the UE). In this situation, the UE may only receive DL signaling or DL packets from either the initial BWP or the MBS BWP based on certain prioritization rule(s) or network configuration(s). For example, at least one of the following rules (Rule #1, Rule #2 and Rule #3) may be configured to the UE:

Rule #1: The initial BWP may always have higher priority than an MBS BWP. So, the UE may switch from an MBS BWP to the initial BWP to receive all or part of the transmitted SSB burst set and physical channels (e.g., Physical Broadcast Channel (PBCH), Physical Downlink Control Channel (PDCCH), etc.) based on the received SSB burst set configuration and/or search space configuration. In addition, the UE may switch to the initial BWP for measurements (e.g., to measure the DMRS multiplexed in the PBCH broadcasted by the serving cell).

Rule #2: The initial BWP may have higher priority than an MBS BWP for part of DL signaling/packet delivery. For example, the UE may only switch to the initial BWP for SSB burst set monitoring and/or for paging reception (e.g., based on the given SSB burst set configuration and/or Discontinuous Reception (DRX) cycle configuration associated with the initial BWP). The UE may not monitor/acquire system information continuously. The UE may only monitor/acquire system information while the UE is triggered by paging reception or SI (System Information) medication indication or publish warning system indication to monitor/acquire the updated system information (e.g., while the systemInfoModification bit in the short message is set to 1 or the etwsAndCmasIndication bit in the short message is set to 1).

Rule #3: An MBS BWP may always have higher priority than initial BWP. For example, a UE may not switch to the initial BWP unless the UE is requested by upper layers. In some implementations, the UE may switch from an MBS BWP to the initial BWP based on the request from the upper layers (e.g., Non-Access Stratum (NAS) layer). For example, if a UE is requested by the NAS layer to use the initial (ProSe) sidelink or (NR/LTE) V2X services, the UE may switch from the MBS BWP to the initial BWP to receive the broadcasting system information for the concerned service(s). In some implementations, the UE may switch from an MBS BWP to the initial BWP based on the request from the RRC layer. For example, the RRC layer may trigger an RRC-related procedure such as an RRC connection establishment procedure, an RRC connection resume procedure, or an RAN notification area update procedure, and etc.

The rules (Rule #1, Rule #2 and Rule #3) may be pre-installed in Universe Subscriber identity Module (USIM), predefined in the 3GPP Technical Specification (TS), and/or or configured by the network. In some implementations, the priority of the initial BWP and/or an MBS BWP are configurable. In some implementations, the priority rules may be configurable.

In some implementations, a UE may switch from an MBS BWP to the initial BWP based on DL signaling transmitted on the MBS BWP. For example, the SSB burst set, search spaces for system information, short message, paging message, and/or DMRS may be configured on an MBS BWP. In some implementations, a UE may switch from an MBS BWP to the initial BWP when one of the following conditions (conditions (a), (b) and (c)) is satisfied:

(a) the UE receives a paging which the systemInfoModification bit in the short message is set to 1 or the etwsAndCmasIndication bit is set to 1;

(b) the UE receives paging message(s) in which the UE ID is included in the parameter pagingrecord; and (c) the UE detects a beam failure event while the UE is monitoring the SSB burst set transmitted on the MBS BWP, where the UE may initiate a beam failure recovery procedure on the initial BWP.

In some implementations, a UE may perform the cell-specific measurement(s) based on the DMRS scrambled in the MBS-BWP instead of the DMRS scrambled in the initial BWP.

Receiving MBSs

In some implementations, the network may provide MBS-related control information (or associated configurations) via broadcast system information, MCCH, or via dedicated signaling. For example, the network may configure the MBS-related control information or the associated configuration(s) of a BWP in RRC signaling. A UE (e.g., in RRC_IDLE state or RRC_INACTIVE state) may receive the MBS-related control information/associated configuration(s) via a Broadcast Control Channel (BCCH) and/or a MCCH. For example, a new SIB may be used to accommodate the configuration of MBS-related control information.

For RRC_IDLE/RRC_INACTIVE UEs, a CORESET may be configured within a common frequency resource for a group-common PDCCH/PDSCH. In one implementation, CORESET 0 may be used by default if the common frequency resource for a group-common PDCCH/PDSCH is an initial BWP and other CORESET(s) is not configured for a UE.

In some implementations, a UE (e.g., in RRC_IDLE or RRC_INACTIVE state) may receive MBS-related control information (e.g., information or DCI transmitted on a group-common PDCCH) on CORESET 0 on the initial DL BWP.

In some implementations, a UE may receive MBS-related control information (e.g., information or DCI transmitted on a group-common PDCCH) on a CORESET configured for MBS or MBS BWP(s).

In some implementations, a UE may receive MBS-related control information on a CORESET configured for MBS or MBS BWP(s) addressed by MBS related RNTI(s).

In some implementations, a UE may receive MBS-related control information on a CORESET configured for MBS on the initial DL BWP.

In some implementations, a UE may receive MBS-related control information on CORESET 0 on the initial DL BWP addressed by a C-RNTI.

In some implementations, a UE may receive MBS-related control information on CORESET 0 on the initial DL BWP addressed by an MBS control RNTI or MBS-related RNTI.

In some implementations, a new type of PDCCH common search space may be defined/configured. A UE may obtain MBS-related control information from the new type of PDCCH common search space, where the MBS-related control information may indicate at least one of the BWP on which the MBS data is transmitted, the (start) position of MBS data transmission, and the period of MBS data transmission.

In some implementations, a UE may obtain the MBS-related control information via a new search space/CORSET, via an existing NR search space/CORSET (e.g., Type0-PDCCH common search space/CORSET 0, or Type0A-PDCCH common search space/CORSET 0).

In some implementations, an RRC_INACTIVE/RRC_IDLE/RRC_CONNECTED UE may monitor an MES-related PDCCH/CORESET, no matter whether the UE is in an On-Duration (or an Opportunity for DRX) of a DRX cycle. An RRC_CONNECTED UE refers to a UE that is operating in RRC_CONNECTED state.

In some implementations, an RRC_INACTIVE/RRC_IDLE/RRC_CONNECTED UE may monitor an MBS-related PDCCH/CORESET within a DRX-off period.

In some implementations, the network may use separated/different CORESETs/search spaces (e.g., non-overlapped CORESET/search space in the frequency domain) to transmit the corresponding control information of different MBSs. For example, MBS #1 may be configured with CORESET #A and/or search space #A. MBS #2 may be configured with CORESET #B and/or search space #B.

In some implementations, a UE may receive the MBS-related control information on CORESET #1 (which may be provided by system information or dedicated signaling) on an initial DL BWP. In some implementations, a UE may receive the MBS-related control information on CORESET #1 on an initial DL BWP addressed by a C-RNTI. In some implementations, a UE may receive the MBS-related control information on CORESET #1 on an initial DL BWP addressed by an MBS-control-RNTI. In some implementations, a UE may receive the MBS-related control information on CORESET #1 on a DL BWP #1 based on the configurations from the network. In some implementation, if a UE operates on DL BWP #1 (which may not be an initial DL BWP) and the CORESET associated with the MBS-related control information is not provided or not present, the UE may receive the MBS-related control information on CORESET 0 on a DL BWP #1. The MBS-control-RNTI may be predefined and/or configurable.

In some implementations, the MBS-related control information may indicate a CORESET and/or the associated search space for decoding a PDCCH addressed by an MBS-related RNTI for MBS data reception. In some implementations, MBS-related control information may include an RNTI associated with an MBS. In some implementations, a common RNTI for all MBS(s) may be utilized, and the data reception for different MBS(s) may be performed based on a per-CORESET/per-search space basis. In some implementations, MBS-related control information may include QoS requirements of an MBS (e.g., high QoS requirements or low QoS requirements.) For an MBS with high QoS requirements, a HARQ operation may be required. For an MBS with low QoS requirements, a HARQ operation may not be required. For example, a UE that receives MBS-related control information may not perform the HARQ operation for a data reception of an MBS if the received MBS-related control information indicates that the QoS requirement for the MBS is low.

Support of Dynamic Change of MBS Delivery Between Multicast and Unicast

In some implementations, the network may configure a threshold to a UE for MBS data reception. The threshold may be configured based on a per-MBS basis. For example, the network may configure Threshold #1 for MBS A and configure Threshold #2 for MBS B. In some implementations, the threshold for MBS data reception may be predefined or be configurable.

In some implementations, a UE may report an MBS status report to the network. The MBS status report may be reported periodically, where the report periodicity may be configured by the network via dedicated signaling or broadcast system information. In some implementations, the reporting of MBS status report may be triggered by specific event(s). For example, when the MBS status changes, a UE may transmit an MBS status report to the network (e.g., via configured grants, dynamic grants, a 2-step RA procedure, or a 4-step RA procedure).

In some implementations, an MBS status report may indicate the target MBS(s) and indicate whether the associated service reception condition is satisfied/met. For example, a Reference Signal Received Power (RSRP)/Reference Signal Received Quality (RSRQ)/Received Signal Strength Indicator (RSSI) threshold may be provided for determining a service reception condition. For example, if a UE determined that the RSRP value of a DL pathloss reference (e.g., an MBS reference signal) is less than or equal to the RSRP threshold, the UE may report an MBS status report to the network to inform that the service reception condition of the MBS is not satisfied/met. For example, if a UE determined that the RSRP value of a DL pathloss reference (e.g., an MBS reference signal) is greater than the RSRP threshold, the UE may report an MBS status report to the network to inform that the service reception condition of the MBS is satisfied/met.

The network may determine whether to switch to a PTP delivery mode or a PTM delivery mode based on the information provided by a UE (e.g., MBS status report). Based on the received MBS status report, the network may adjust the Modulation Coding Scheme (MCS) for the delivery of MBS data via a PTM delivery mode (or multicast mode), or configure the UE to receive the MBS via a PTP delivery mode (or unicast mode).

Once a UE reports an MBS status report #1 to the network, the UE may start or restart a timer T1. Once the timer T1 is started or restarted, the UE may be prohibited from reporting an MBS status report #2 to the network until the timer T1 expires. In one implementation, in a case that second MBS status report #2 has a different content than the previous MBS status report (e.g., the MBS status report #1), the UE may be permitted to report the MBS status report #2 to the network when the timer T1 is still running.

In some implementations, the timer T1 may be started or restarted by the UE when at least one of the following conditions is satisfied: the UE transmits an MBS status report, the active BWP changes (e.g., from one MBS BWP to another MBS BWP), the value of the timer T1 is reconfigured, and the threshold is reconfigured or released.

In some implementations, a UE may request the network to deliver MBS data via a PTP delivery mode (or unicast mode). For example, when the associated service reception condition is not satisfied/met (e.g., the signal strength of the service reception is less than, or equal to, a threshold), the UE may request the network to deliver MBS(s) via the PTP delivery mode (or unicast mode). The network may not respond to the UE's request for MBS data delivery via the PTP delivery mode. In some implementations, network may reject the UE's request by sending a reject message to the UE via the PTP delivery mode. In this situation, the network may instruct the UE to suspend/stop sending the request for MBS data deliver via the PTP delivery mode. The network may redirect the UE to another cell. In some implementations, the network may change the configuration of MBS data delivery via a PTM delivery mode in order to improve the data reception performance. In some implementations, a UE may request the network to stop transmitting MBS data via the PTP delivery mode (or unicast mode). For example, when the associated service reception condition is satisfied/met (e.g., the signal strength is larger than or equal to a threshold), the UE may request the network to stop transmitting MBS data via the PTP delivery mode.

In some implementations, when a UE requests the network to deliver MBS data via the PTP delivery mode (or unicast mode), the UE may start or restart a timer T2. Once the timer T2 is (re)started, the UE may be prohibited from requesting the network to delivery MBS(s) via PTP delivery mode (or unicast mode) again until the timer T2 expires. In some implementations, the UE may be permitted to request the network to delivery MBS data via the PTP delivery mode (or unicast mode) when the timer T2 is still running, in a case that the requested MBS data has different content than the previously-requested MBS data.

In some implementations, the timer T2 may be started or restarted by the UE when at least one of the following conditions is satisfied: the UE transmits a request for delivering MBS data or a request for stopping delivering MBS data to the network, the active BWP changes (e.g., from one BWP to another BWP), the value of the timer T2 is reconfigured, and the threshold is reconfigured or released.

UL Feedback Mechanism

In some implementations, a HARQ operation for MBS data reception may be supported. The HARQ operation may be enabled or disabled by the network via DCI, MAC Control Element (CE), and/or RRC signalling. For example, if the HARQ operation is enabled, a UE may report to the network a HARQ-ACK feedback for a corresponding MBS data reception. If the HARQ operation is disabled, the UE may not report to the network a HARQ-ACK feedback for the corresponding MBS data reception. In some implementations, a HARQ operation may not be performed when a UE receives MBS data in an RRC_IDLE state or an RRC_INACITVE state. In some implementation, a UE may not perform the HARQ operation for the data reception of an MBS with low QoS requirements. In some implementation, a UE may not perform HARQ operation for the data reception of an MBS, even if the MBS is with high QoS requirements.

In some implementations, whether an MBS delivered via the PTM delivery mode (or multicast mode) supports the HARQ operation or other UL feedback mechanisms may be configurable. For example, for MBS #1, the network may configure (e.g., via an RRC message, an MAC CE, or DCI) one or more of the target UEs that receive the MBS #1 to perform the HARQ operation or other UL feedback mechanisms; while for MBS #2, the network may configure one or more of the target UEs that receive the MBS #2 not to perform the HARQ operation (or implement chase combining HARQ protocols only) or other UL feedback mechanism.

In some implementations, the reserved bits in the existing DCI may be used to indicate whether current MBS(s) supports the HARQ operation or other UL feedback mechanisms. In some implementations, the network may implicitly indicate whether the current MBS(s) supports the HARQ operation or other UL feedback mechanisms. For example, if the network transmits the MBS-related control information to the UE via UE-specific DCI, the UE may know that the MBS(s) corresponding to the MBS-related control information supports the HARQ operation or other UL feedback mechanisms. Otherwise, the UE may determine that the current MBS does not support the HARQ operation or other UL feedback mechanisms. The UE may determine whether the UE-specific DCI is used for MBS according to several factors, such as an MBS-related RNTI scrambling the UE-specific DCI, the field in the UE-specific DCI, and/or a separated CORESET/search space on which the UE-specific DCI is received.

In some implementations, a UE that receives an MBS may be provided with dedicated PUCCH resource(s) for transmitting a HARQ-ACK feedback (e.g., an Acknowledgement (ACK) or Non-Acknowledgement (NACK)) for a corresponding MBS data reception. The dedicated PUCCH resource(s) may be provided by the network via dedicated signaling. In some implementations, the network may implicitly inform UE(s) of the dedicated PUCCH resource(s). For example, the dedicated PUCCH resources may be provided in the X OFDM symbols right after the end of an MBS transmission, where X is predefined or configurable positive integer. For example, the UE may obtain the value of X via dedicated signaling or broadcast system information. In some implementations, the network may provide different gaps value to different UEs, where each gap value represents a gap between a PUCCH position indicated by DCI (and this DCI may also indicate a PDSCH resource carrying the MBS data) and a dedicated PUCCH position (each dedicated PUCCH position may be configured for an individual UE). For example, the network may provide the gap value to different UEs via the predefined rules or UE-specific signaling. In some implementations, the dedicated PUCCH resources for a UE may be provided via dedicated signaling, and the dedicated PUCCH resources are allowed to be used for HARQ feedback transmission (or HARQ operation) upon/after the UE receives the dedicated signaling. In this case, a UE may use the dedicated PUCCH resources for ACK/NACK transmission when receiving the dedicate signaling. In some implementations, the dedicated PUCCH resources for a UE may be provided via dedicated signaling, and the dedicated PUCCH resources are not allowed to be used for HARQ feedback transmission (or HARQ operation) upon/after the UE receives the dedicated signaling. In this case, the UE may not use the dedicated PUCCH resources for ACK/NACK transmission when receiving the dedicate signaling. In some implementations, the network may use DCI, MAC CE, or RRC signaling to activate (or deactivate) the configured PUCCH resource for ACK/NACK transmission for an MBS. In some implementations, the UL feedback mechanism may be performed on a UL BWP which may belong to the original UL or a supplementary UL. In some implementations, for an RRC_INACTIVE/RRC_IDLE UE, the feedback mechanism may be provided via a 2-step RA procedure or a 4-step RA procedure.

Reliability

In some implementations, a UE may receive MBS data delivered via a PTM delivery mode (or multicast mode) and MBS data delivered via a PTP delivery mode (or unicast mode) simultaneously. For example, a UE may receive first MBS data via a PTM RLC entity and second MBS data via a PTP RLC entity, where the second MBS data is a copy/duplicate of the first MBS data. The PTM RLC entity and the PTP RLC entity may be associated with a common PDCP entity. In some implementations, a UE may autonomously stop receiving MBS data delivered via the PTM delivery mode (or multicast mode) if the UE considers that the data reception condition for PTP delivery (or unicast mode) is good enough. In some implementations, a UE may stop receiving MBS data delivered via the PTM delivery mode (or multicast mode) if the data reception condition for PTP delivery (or unicast mode) is satisfied/met (e.g., the strength/quality of the received signal is greater than or equal to a threshold). The threshold may be predefined or be configured. For example, the threshold may be configured by the network via dedicated signaling or broadcast system information. For example, the threshold may be a signal quality-based threshold, e.g., an RSRP threshold, an RSRQ threshold, an RSSI threshold, or a buffer size-based threshold.

FIG. 1 illustrates a flowchart for a method 100 for MBS data reception, in accordance with an implementation of the present disclosure. Although actions 102 and 104 are delineated as separate actions represented as independent blocks in FIG. 1, these separately delineated actions should not be construed as necessarily order dependent. The order in which the actions are performed in FIG. 1 is not intended to be construed as a limitation, and any number of the disclosed blocks may be combined in any order to implement the method, or an alternate method.

In NR, since different MBSs may have different characteristics (e.g., data volume per packet or data delivery period) and/or QoS requirements, configuring CORESET(s), search space(s), and/or frequency resource(s) to a UE based on an MBS basis can facilitate resource utilization and reduce UE's power consumption.

As in action 102, a UE may receive MBS-related control information from a BS. The MBS-related control information may indicate at least one of a first Radio Network Temporary Identifier (RNTI) associated with an MBS, a Control Resource Set (CORESET) configured for an MBS, a search space configured for the MBS, and a frequency resource configured for the MBS. In some other implementations, the MBS-related control information may be the MBS-related control information described in various implementations of the present disclosure.

In some implementations, each of the CORESET and the search space indicated by the MBS-related control information may be configured per MBS basis.

In action 104, the UE may receive data of the MBS (which can also be referred to as "MBS data" in the present disclosure) from the BS based on the MBS-related control information. For example, the UE may monitor and receive the data of MBS on the frequency resource indicated by the MBS-related control information. For example, the UE may receive the data of the MBS on a PDSCH with a first CRC scrambled by the first RNTI indicated by MBS-related control information, where the PDSCH may be indicated by a PDCCH with a second CRC scrambled by a second RNTI having a different RNTI value from the first RNTI. For example, the first RNTI may be a Group RNTI, and the second RNTI may be a UE-specific RNTI.

As described previously, different MBSs may have different characteristics (e.g., data volume per packet or data delivery period) and/or QoS requirements. For example, an MBS with high QoS requirements may require high communication reliability, whereas an MBS with low QoS requirements may only require normal or low communication reliability. To meet the various QoS/reliability requirements, a method that can flexibly/dynamically enable or disable a HARQ operation for an MBS at the UE side may be needed, as illustrated in FIG. 2.

Figure 2:
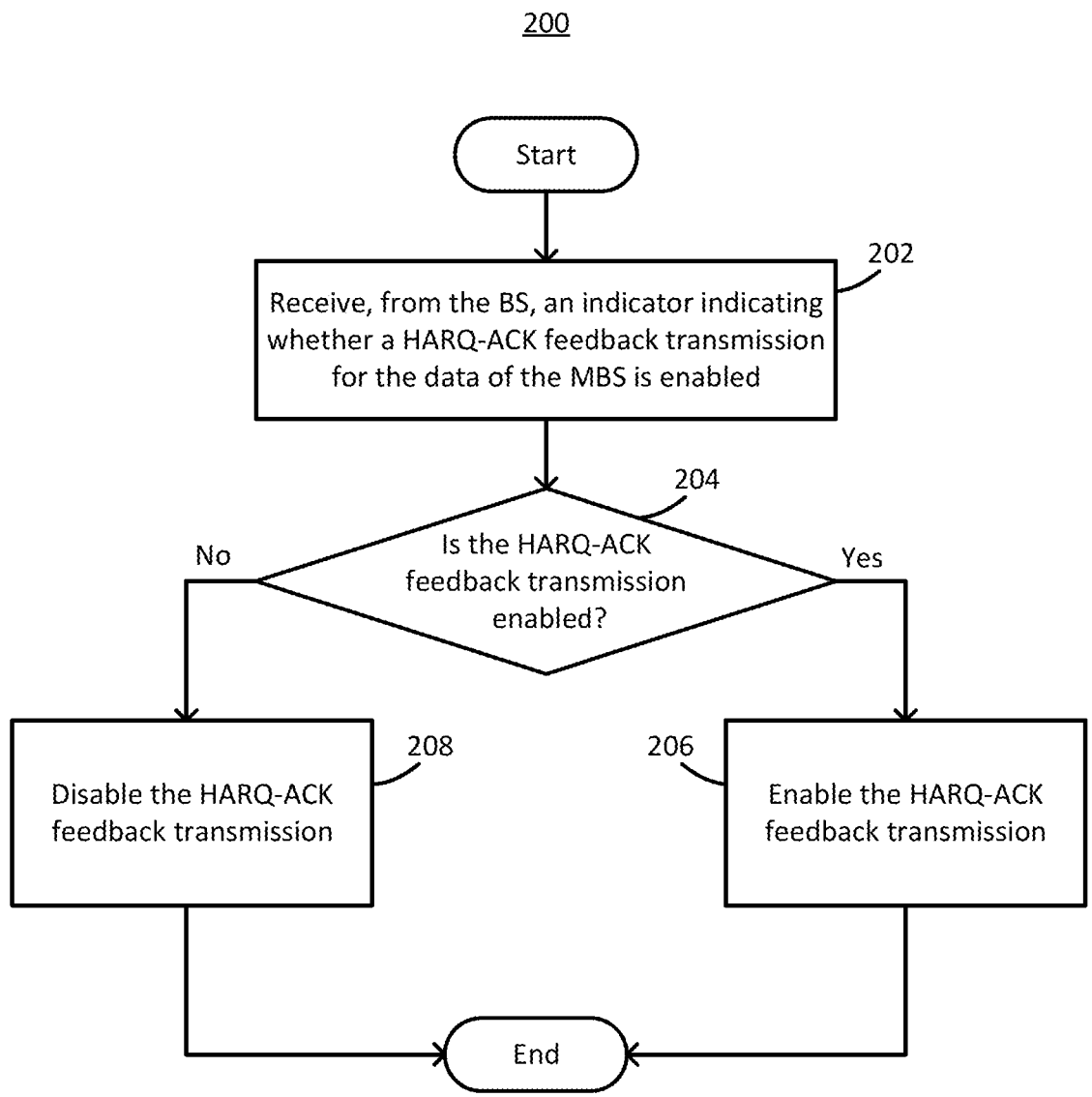
FIG. 2 illustrates a flowchart for a method for MBS data reception, in accordance with an implementation of the present disclosure.

FIG. 2 illustrates a flowchart for a method 200 for MBS data reception, in accordance with an implementation of the present disclosure. The method 200 can be performed independently or in combination with the method 100 illustrated in FIG. 1.

In action 202, the UE may receive, from the BS, an indicator indicating whether a HARQ-ACK feedback transmission (or HARQ operation) for the data of the MBS is enabled.

In action 204, the UE may determine whether the HARQ-ACK feedback transmission for the data of the MBS is enabled.

In action 206, if the outcome of the determination in action 204 is Yes, the UE may enable the HARQ-ACK feedback transmission for the data of the MBS. For example, the UE may generate and transmit a HARQ-ACK feedback (e.g., ACK/NACK) to indicate whether the reception of the data of the MBS is successful.

In action 208, if the outcome of the determination in action 204 is No, the UE may disable the HARQ-ACK feedback transmission for the data of the MBS. In this situation, the UE may not generate or transmit a HARQ-ACK feedback that indicates whether the reception of the data of the MBS is successful.

Figure 3:
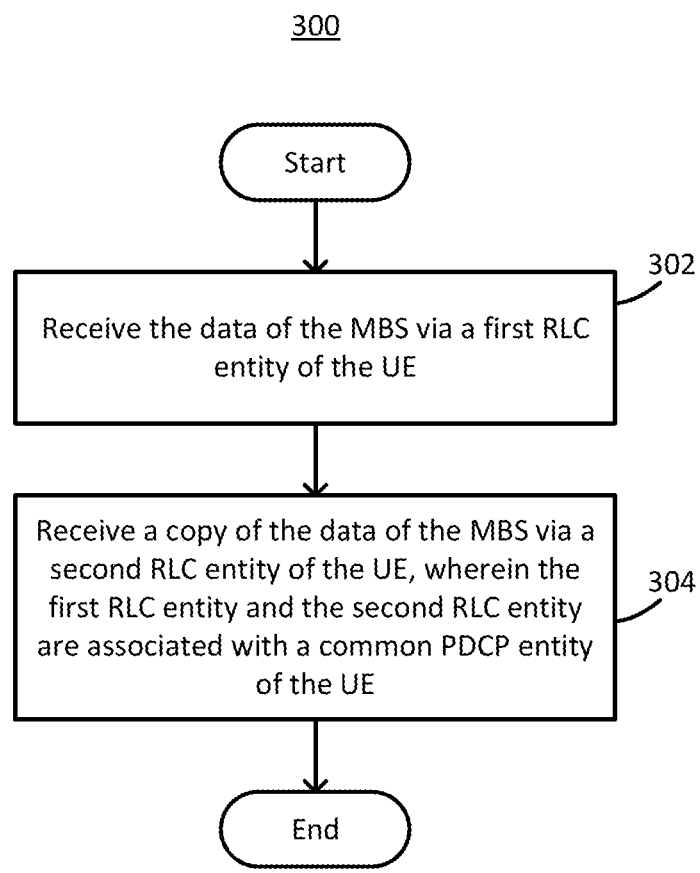
FIG. 3 illustrates a flowchart for a method for MBS data reception, in accordance with an implementation of the present disclosure.

In some implementations, duplication of MBS data/packets can also be used to improve the reliability of MBS data transmission (due to the gain of frequency diversity and/or time diversity), as illustrated in FIG. 3.

FIG. 3 illustrates a flowchart for a method 300 for MBS data reception, in accordance with an implementation of the present disclosure. The method 300 can be performed independently or in combination with any of the method 100 illustrated in FIG. 1 and the method 200 illustrated in FIG. 2.

In action 302, the UE may receive the data of the MBS via a first RLC entity of the UE.

In action 304, the UE may receive a copy of the data of the MBS via a second RLC entity of the UE, where the first RLC entity and the second RLC entity are associated with a common PDCP entity of the UE.

Figure 4:
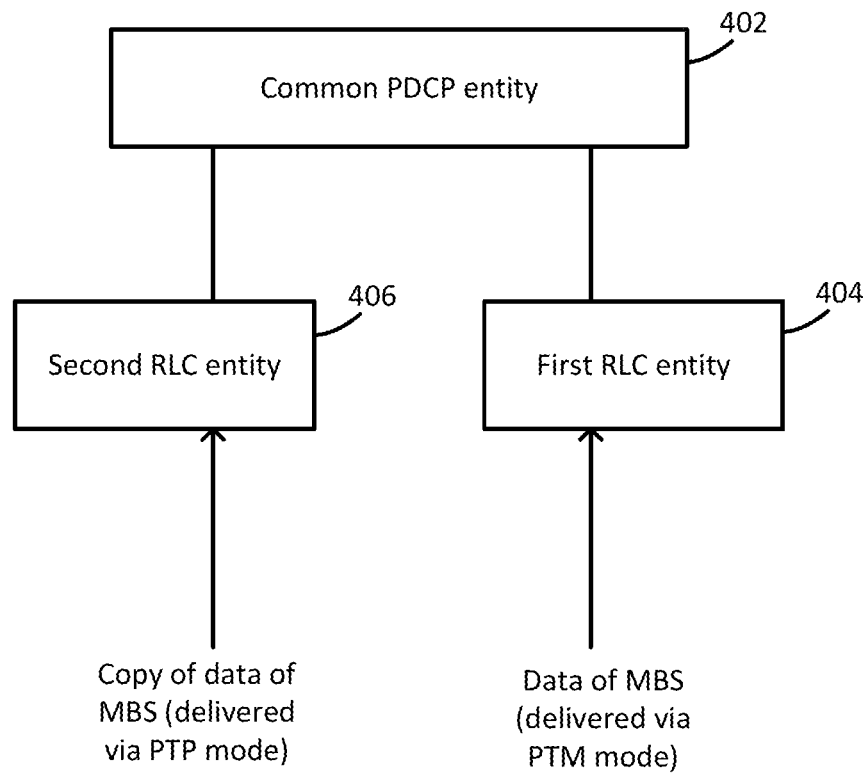
FIG. 4 is a schematic diagram illustrating a common Packet Data Convergence Protocol (PDCP) entity associated with a first Radio Link Control (RLC) entity used to receive data of an MBS and a second RLC entity used to receive the copy/duplicate of the data of the MBS.

In some implementations, the data of the MBS may be transmitted by the BS under a PTM delivery mode (or multicast mode), and the copy of the data of the MBS may be transmitted by the BS under a PTP delivery mode (or unicast mode), as illustrated in FIG. 4.

FIG. 4 is a schematic diagram illustrating a common PDCP entity 402 associated with a first RLC entity 404 used to receive the data of the MBS and a second RLC entity 406 used to receive the copy/duplicate of the data of the MBS. In the implementation, the data of the MBS may be transmitted/delivered by the BS via a PTM delivery mode (or multicast mode), and the copy/duplicate of the data of the MBS may be transmitted/delivered by the BS via a PTP delivery mode (or unicast mode).

In a legacy system such as LTE, an RRC_IDLE UE or an RRC_INACTIVE UE may only receive DL data/signaling on an initial DL BWP. However, the bandwidth of the initial DL BWP is limited and may not be enough to support MBS data transmission. Thus, allowing an RRC_IDLE UE or an RRC_INACTIVE UE to receive MBS data on frequency resource(s) that does not belong to the initial DL BWP may enhance resource utilization and improve the system performance. In some implementations, a UE may receive the data of the MBS via the frequency resource (indicated by the MBS-related control information) when the UE operates in one of an RRC_IDLE state, an RRC_INACTIVE state and an RRC_CONNECTED state, wherein the frequency resource may not overlap an initial BWP configured to the UE in a frequency domain.

Figure 5:
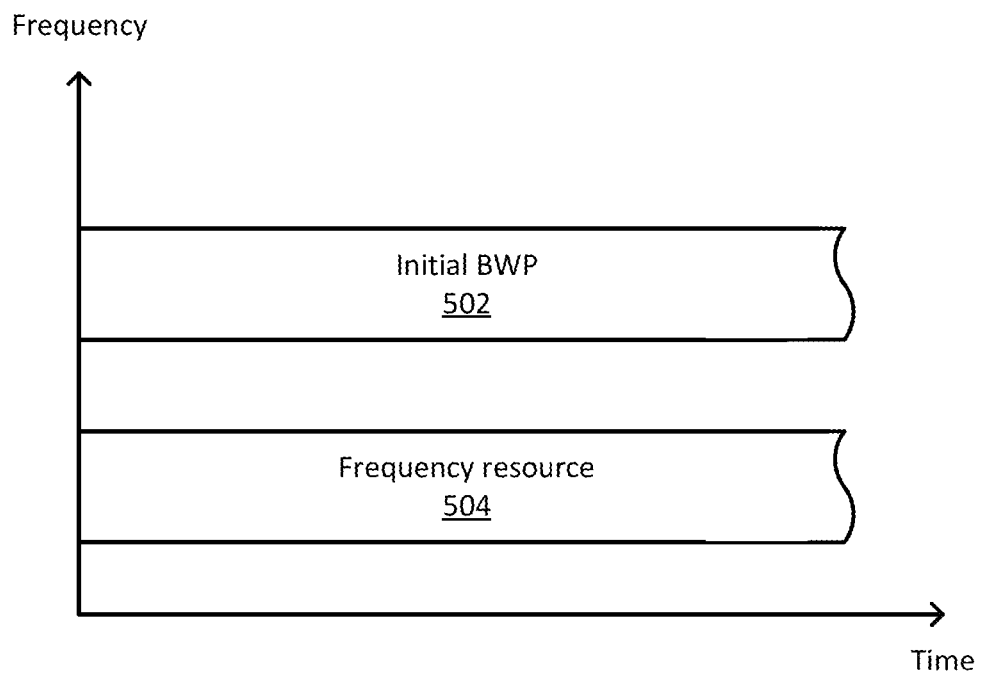
FIG. 5 illustrates an example of resource allocation of an initial BWP configured to a UE and a frequency resource indicated by MBS-related control information.

FIG. 5 illustrates an example of resource allocation of an initial BWP 502 configured to the UE and a frequency resource 504 indicated by the MBS-related control information. The frequency relative positions of the initial BWP 502 and the frequency resource 504 are not limited to that illustrated in FIG. 5. For example, the initial BWP 502 may be located in a frequency band which is higher or lower than the frequency resource 504.

As illustrated in FIG. 5, the frequency resource 504 does not overlap the initial BWP 504 in the frequency domain. In some implementations, the frequency resource 504 may refer to a BWP, part of a BWP, or a resource set collected from one or more BWPs.

Figure 6:
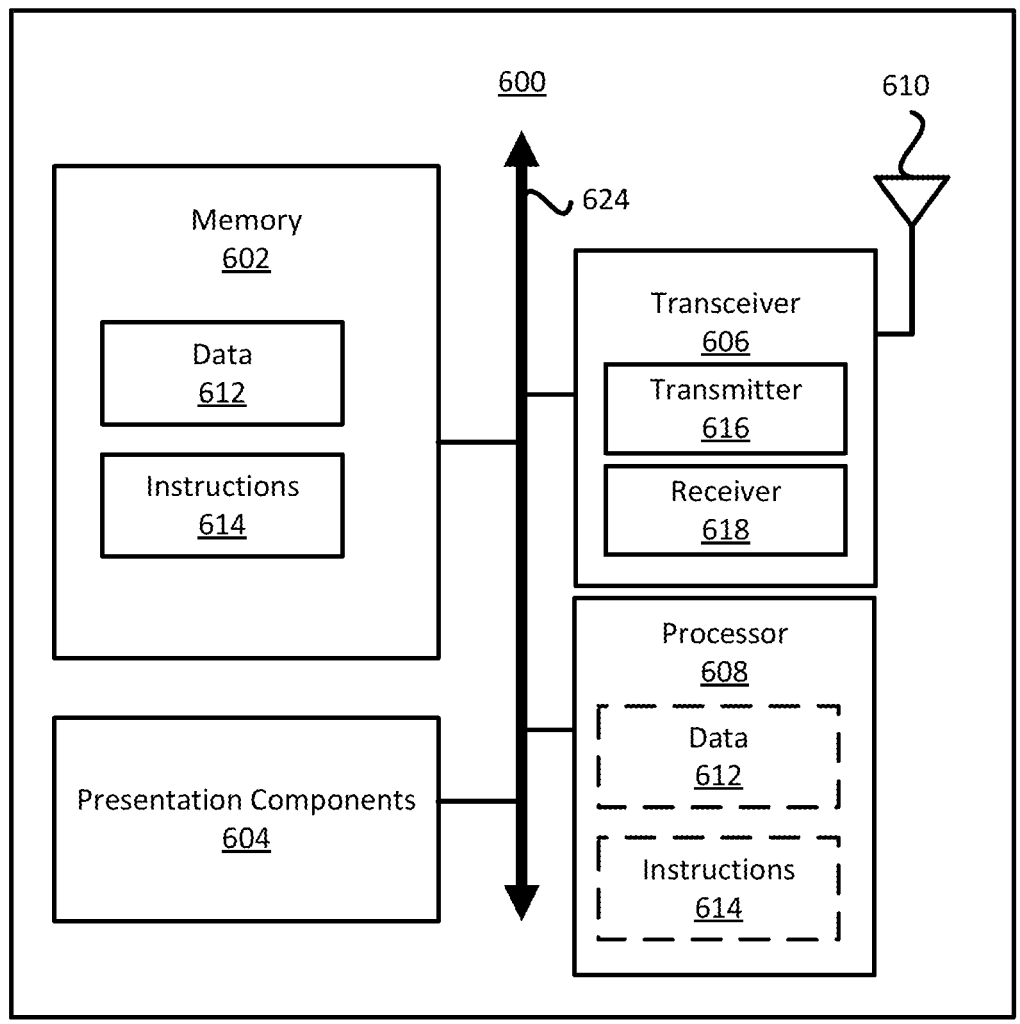
FIG. 6 illustrates a block diagram of a node for wireless communication, in accordance with various aspects of the present disclosure.

FIG. 6 illustrates a block diagram of a node 600 for wireless communication, in accordance with various aspects of the present disclosure. As illustrated in FIG. 6, the node 600 may include a transceiver 606, a processor 608, a memory 602, one or more presentation components 604, and at least one antenna 610. The node 600 may also include an RF spectrum band module, a BS communications module, a network communications module, and a system communications management module, Input/Output (I/O) ports, I/O components, and a power supply (not explicitly illustrated in FIG. 6). Each of these components may be in communication with each other, directly or indirectly, over one or more buses 624. In one implementation, the node 600 may be a UE or a BS that performs various functions described herein, for example, with reference to FIGS. 1 through 5.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In one implementation, the transceiver 606 may be configured to transmit in different types of subframes and slots, including, but not limited to, usable, non-usable and flexibly usable subframes and slot formats. The transceiver 606 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 602 may include computer storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 6, the memory 602 may store computer-readable and/or computer-executable instructions 614 (e.g., software codes) that are configured to, when executed, cause the processor 608 to perform various functions described herein, for example, with reference to FIGS. 1 through 5. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the baseband communications module, and/or the network communications module. The processor 608 may also process information to be sent to the transceiver 606 for transmission through the antenna 610, to the network communications module for transmission to a CN.

One or more presentation components 604 may present data indications to a person or other devices. Examples of presentation components 604 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the specific implementations described above. Still, many rearrangements, modifications, and substitutions are possible without departing from the scope of the present disclosure.

What is claimed is:

1. A method performed by a User Equipment (UE) for multicast service data reception, the method comprising:
    determining whether a first Physical Downlink Control Channel (PDCCH) addressed to a first Radio Network Temporary Identifier (RNTI) is received on a first Bandwidth Part (BWP), the first PDCCH indicating a downlink assignment of data of a multicast service;
    in a case that a BWP inactivity timer and a default BWP are configured, and the first BWP is not the default BWP,
        starting or restarting the BWP inactivity timer after determining that the first PDCCH is received on the first BWP, and
        switching from the first BWP to the default BWP when the BWP inactivity timer expires; and
    in a case that the BWP inactivity timer is configured, but the default BWP is not configured, and the first BWP is not an initial BWP,
        starting or restarting the BWP inactivity timer after determining that the first PDCCH is received on the first BWP, and
        switching from the first BWP to the initial BWP when the BWP inactivity timer expires.

2. The method of claim 1, further comprising:
    receiving control information from a Base Station (BS); and
    receiving the data of the multicast service according to the control information,
    wherein the control information indicates at least one of:
    a Control Resource Set (CORESET) configured for the multicast service,
    a search space configured for the multicast service, and
    a frequency resource configured for the multicast service.

3. The method of claim 1, further comprising:
    receiving, from a Base Station (BS), an indicator indicating whether a Hybrid Automatic Repeat reQuest (HARQ)-Acknowledgement (ACK) feedback transmission for the data of the multicast service is enabled.

4. The method of claim 1, further comprising:
receiving the data of the multicast service via a first Radio Link Control (RLC) entity of the UE; and
receiving a copy of the data of the multicast service via a second RLC entity of the UE, wherein the first RLC entity and the second RLC entity are associated with a common Packet Data Convergence Protocol (PDCP) entity of the UE.

5. The method of claim 4, wherein the data of the multicast service is received from a Base Station (BS) under a Point-to-Multiple (PTM) delivery mode, and the copy of the data of the multicast service is received from the BS under a Point-to-Point (PTP) delivery mode.

6. The method of claim 1, further comprising:
transmitting an indication that the UE supports receiving the data of the multicast service to a Base Station (BS).

7. The method of claim 1, further comprising:
determining whether there is an ongoing random access procedure associated with a serving cell; and
starting or restarting the BWP inactivity timer after determining that there is no ongoing random access procedure associated with the serving cell.

8. The method of claim 1, further comprising:
determining whether an ongoing random access procedure associated with a serving cell is successfully completed upon reception of a second PDCCH addressed to a second RNTI; and
starting or restarting the BWP inactivity timer after determining that the ongoing random access procedure is successfully completed.

9. The method of claim 8, wherein the second RNTI is a Cell RNTI (C-RNTI).

10. A User Equipment (UE) for multicast service data reception, the UE comprising:
at least one processor; and
at least one memory coupled to the at least one processor, the at least one memory storing a set of computer-executable programs that when executed by the at least one processor causes the at least one processor to perform operations comprising:
determining whether a first Physical Downlink Control Channel (PDCCH) addressed to a first Radio Network Temporary Identifier (RNTI) is received on a first Bandwidth Part (BWP), the first PDCCH indicating a downlink assignment of data of a multicast service;
in a case that a BWP inactivity timer and a default BWP are configured, and the first BWP is not the default BWP,
starting or restarting the BWP inactivity timer after determining that the first PDCCH is received on the first BWP, and
switching from the first BWP to the default BWP when the BWP inactivity timer expires; and
in a case that the BWP inactivity timer is configured, but the default BWP is not configured, and the first BWP is not an initial BWP,
starting or restarting the BWP inactivity timer after determining that the first PDCCH is received on the first BWP, and
switching from the first BWP to the initial BWP when the BWP inactivity timer expires.

11. The UE of claim 10, wherein the operations further comprise:
receiving control information from a Base Station (BS); and
receiving the data of the multicast service according to the control information,
wherein the control information indicates at least one of:
a Control Resource Set (CORESET) configured for the multicast service,
a search space configured for the multicast service, and
a frequency resource configured for the multicast service.

12. The UE of claim 10, wherein the operations further comprise:
receiving, from a Base Station (BS), an indicator indicating whether a Hybrid Automatic Repeat reQuest (HARQ)-Acknowledgement (ACK) feedback transmission for the data of the multicast service is enabled.

13. The UE of claim 10, wherein the operations further comprise:
receiving the data of the multicast service via a first Radio Link Control (RLC) entity of the UE; and
receiving a copy of the data of the multicast service via a second RLC entity of the UE, wherein the first RLC entity and the second RLC entity are associated with a common Packet Data Convergence Protocol (PDCP) entity of the UE.

14. The UE of claim 13, wherein the data of the multicast service is received from a Base Station (BS) under a Point-to-Multiple (PTM) delivery mode, and the copy of the data of the multicast service is received from the BS under a Point-to-Point (PTP) delivery mode.

15. The UE of claim 10, wherein the operations further comprise:
transmitting an indication that the UE supports receiving the data of the multicast service to a Base Station (BS).

16. The UE of claim 10, wherein the operations further comprise:
determining whether there is an ongoing random access procedure associated with a serving cell; and
starting or restarting the BWP inactivity timer after determining that there is no ongoing random access procedure associated with the serving cell.

17. The UE of claim 10, wherein the operations further comprise:
determining whether an ongoing random access procedure associated with a serving cell is successfully completed upon reception of a second PDCCH addressed to a second RNTI; and
starting or restarting the BWP inactivity timer after determining that the ongoing random access procedure is successfully completed.

18. The UE of claim 17, wherein the second RNTI is a Cell RNTI (C-RNTI).

* * * * *